United States Patent [19]
Unkauf

[11] 3,794,921
[45] Feb. 26, 1974

[54] DIFFERENTIALLY ADAPTIVE COMMUNICATION SYSTEM

[75] Inventor: Manfred G. Unkauf, Franklin, Mass.
[73] Assignee: Raytheon Company, Lexington, Mass.

[22] Filed: Nov. 24, 1971
[21] Appl. No.: 201,750

[52] U.S. Cl. ................ 325/42, 178/88, 179/15 AN, 325/65, 325/324, 328/162, 329/132, 333/18
[51] Int. Cl. ................ H03d 3/00
[58] Field of Search .... 178/88; 179/15 AN; 325/42, 325/65, 320, 324, 472; 329/131, 132, 133, 122, 123; 333/18; 328/56, 162, 164; 343/7.7, 8, 9, 17.1 R

[56] References Cited
UNITED STATES PATENTS

| | | | |
|---|---|---|---|
| 3,614,623 | 10/1971 | McAuliffe | 325/42 |
| 3,059,188 | 10/1962 | Voelcker | 329/123 |
| 3,525,945 | 8/1970 | Puente | 329/122 |
| 3,638,125 | 1/1972 | Goell | 329/122 X |
| 3,680,092 | 7/1972 | Scott | 343/9 X |
| 3,681,745 | 8/1972 | Perlman et al. | 343/7.7 X |
| 3,508,262 | 4/1970 | Howells | 343/7.7 X |

*Primary Examiner*—Charles E. Atkinson
*Assistant Examiner*—R. Stephen Dildine, Jr.
*Attorney, Agent, or Firm*—Joseph D. Pannone; Milton D. Bartlett; David M. Warren

[57] ABSTRACT

A communication system for improved reception of signals over distorted communication channels, multipath environments and telephone cables is disclosed in which phase shift keyed coded pulses are transmitted such that their respective multipath contributions are separable at a differentially adaptive receiver which stores previous samples of the distorted transmitted pulse for use as a reference in a coherent matched filter type detector employing decision feedback to allow coherent detection without channelizing filters in systems using both binary and four phase modulation. The differentially adaptive receiver is employed both in modulator-demodulator type systems and in predetection combination communication systems.

32 Claims, 10 Drawing Figures

DIFFERENTIALLY ADAPTIVE COMMUNICATION SYSTEM

BACKGROUND OF THE INVENTION

This invention relates to digital communication systems operable in time variant dispersive channels such as tropospheric scatter, undersea channels, telephone cables, and other multipath corrupted channels. More particularly, a differentially adaptive receiver is disclosed in which transmitted signals in the form of pulses and their associated multipath returns are isolated at the receiver to the extent that multipath corruption is substantially eliminated. The receiver acts as a matched filter for each distorted isolated pulse by using the stored complex envelopes of previous pulses as a reference. The response of each receiver channel to a certain pulse is essentially identical over a period of several pulse intervals such that the data rate is fast compared to the channel fading rate which condition is met in most fading channels of practical interest.

In systems of the prior art, such as adaptive equalizers, complex circuitry was required to gate out multipath returns, however, this also degrades the signal of interest.

A previous prior art approach to a multipath combiner-demodulator with large time bandwidth products is described by S. M. Sussman in the IEEE Transactions on Information Theory entitled "A Matched Filter Communications System for Multipath Channels," June 1960, pages 367–373. In this system, the signal to be transmitted is spread in time and/or frequency so that it will contain the largest possible multipath contributions. A set of waveforms separated in frequency are generated to signal either a mark or a space with the resultant receiver including a delay in a recirculating loop equal to the baud period of the transmitted data with the loop storing the sum of both previous received mark and space waveforms. This stored coherence set of reference signals is correlated with the input signals in both the mark and space legs of the receiver. The receiver leg with greater correlation to the stored reference is then chosen for the bit decision or data choice which must be made, thus for optimum performance the mark and space signals, either by virtue of design or by the channel induced distortion, should have negligible cross correlation and an input filter is required to separate mark from space thereby limiting the modulation which may be employed to coherent frequency shift keying.

In contradistinction, the present invention does not require mark-space separation filters and thereby digital phase shift keying may be employed with mark-space separation provided by decision feedback, as will be explained. The present system is a highly efficient receiver which is useful both as a receiver and as a modulator-demodulator and which can be used to recover energy in distorted received pulses whether the distortion is due to multipath propagation or filter distortion. The system is applicable to long distance high frequency, VHF tropospheric scatter, air-to-air and air-to-ground transmission since the differentially adaptive receiver technique solves the basic problem of efficiently demodulating digital signals that have been distorted by multipath propagation or filter distortion.

The effect of frequency selective fading is to introduce an amplitude and phase distortion in the receiver channel transfer function which is time variant and when several independent diversity channels are available with similar statistical properties, the frequency selectivity will be uncorrelated between channels. For analog frequency multiplex transmission, the effect of frequency selectivity is to introduce cross talk or intermodulation distortion which results in baseband noise. This noise sets an upper limit on the obtainable signal quality and therefore limits the channel capacity. For digital transmissions, the frequency selectivity introduces intersymbol interference which increases the receiver sensitivity to noise and may even produce errors in the absence of noise. The result of this distortion is to introduce an irreducible error rate for the channel and thereby limit channel capacity for a given performance level.

One method of reducing multipath effects is the use of predetection combination technique such as are described in U.S. Pat. No. 3,471,788 of W. J. Bickford et al in which a multiplicity of incoming signals are combined prior to detection by heterodyning each incoming signal with a common signal. Intermediate frequency signals are generated, each of which has a phase equal to but opposite that of the corresponding incoming signal. When each of the incoming signals and their corresponding intermediate frequency signals are beat together, resultant signals are formed and all resultant signals of the same phase are combined to produce an output which is substantially unaffected by multipath contributions. While such systems are highly efficient in the combining of signals corrupted by Gaussian noise, severe distortion in one or more of the diversity channels cannot always be resolved.

Another method of reducing multipath error is the prior art adaptive equalizer combiner which will remove the distortion introduced by the channel acting as a transversal filter and then a classical combiner could sum the equalized outputs. However, very often under the conditions of a frequency selective fade, the channel transfer function has a null which makes the corresponding transversal filter non-realizable. In addition, the adaptive equalizer should operate in a predetection manner which renders it both complicated and costly for optimum performance.

The present invention overcomes these drawbacks of the prior art and permits synthetic phase isolation type predetection combiners for digital signals to operate efficiently even when the propagation channel is highly frequency selective. Additionally, a differentially adaptive receiver is described which, in optimum form, employs phase shift keyed signals. While theoretically, to make optimum use of both the energy received and to conserve spectrum, the optimum receiver takes the form of an adaptive equalizer, a transversal filter followed by a matched filter detector; in practice, the selection of transmitted waveforms is often limited by the power amplifier employed and suboptimum waveforms are usually required. The adaptive equalizer will only approximate the ideal to a degree which depends on the circuit complexity employed.

SUMMARY OF THE INVENTION

A differentially adaptive receiver is described in which phase coded pulses are transmitted in such a way that their respective multipath contributions are separated at the receiver which receiver is differentially adaptive in that a reference is derived which has the same complex envelope as the incoming signal. This reference is derived from the digital data decision made on incoming signals which is recirculated and combined with the delayed input to inverse modulate the incomming signals, thereby providing only the signal envelope, which is an optimum coherent reference for a matched filter. Decision feedback is employed to allow coherent phase shift keyed detection without channelizing filters. Both binary and four phase modulation can be employed.

In another embodiment the basic synthetic phase isolation predetection combiner is modified to operate efficiently when the propagation channel is highly frequency selective by utilizing a recirculating storage loop in place of the narrow band filters of such predetection combination systems which stabilizes the reference against occasional decision errors.

BRIEF DESCRIPTION OF THE DRAWINGS

Further advantages of the invention will become apparent from the following specification taken in connection with the accompanying drawings wherein like reference characters identify parts of like function throughout the different views thereof.

DESCRIPTION OF THE PREFERRED EMBODIMENTS

Figure 1A:
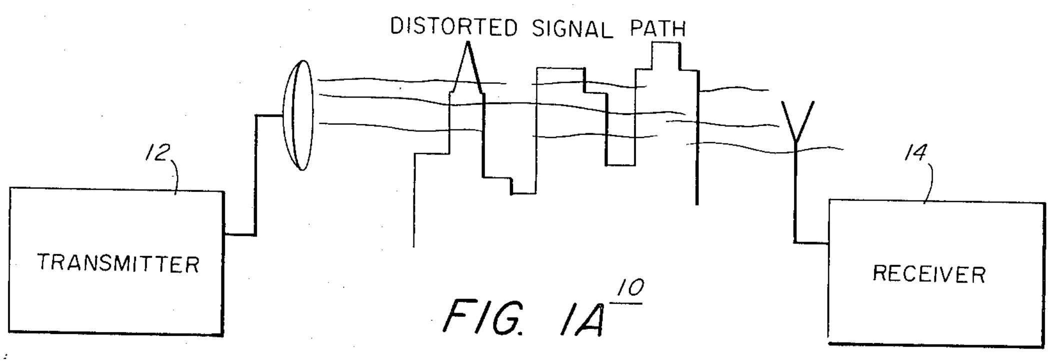
FIG. 1A is a block diagram of a generalized digital communication system for transmitting and receiving data over corrupted transmission paths.

Referring now to FIG. 1A, there is illustrated generally at 10 a data communication system for transmission over distorted channels. A transmitter 12 transmits a train of data pulses which, when they impinge upon obstructions such as buildings, produce multipath errors due to the additional reflections which occur when the signal bounces from these obstructions. This results in signal fading at the receiver 14 unless some means of compensation is provided, with this signal fading usually being frequency selective. When receiver 14 is adaptive to channel conditions, improved reception occurs.

Figure 1B:
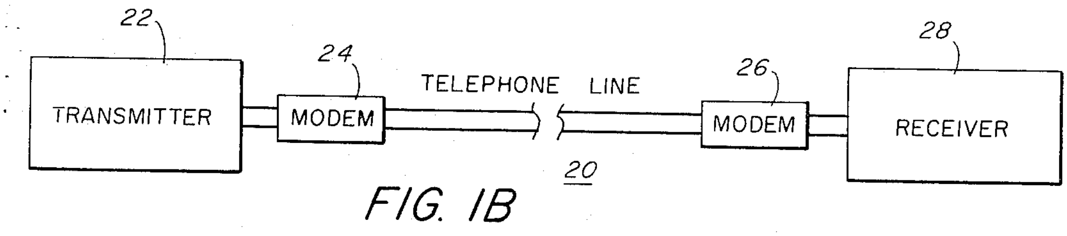
FIG. 1B is a block diagram of a digital communication system for transmitting and receiving data over telephone lines.

The same problem exists on telephone channels as illustrated generally at 20 by FIG. 1B. A transmitter multiplexer 22 generates data which is transmitted over telephone lines after processing in a modulator-demodulator 24 called a modem which adjusts the data rate to the transmission line requirements. Reflections which cause echoes in the transmission line results in signal degradation with possibly data loss when the transmitted signals are received by modem 26 and coupled to receiver 28 unless that receiver is differentially adaptive in order that processing of the corrupted received signals can adapt to varying channel conditions to prevent data loss.

Figure 2:
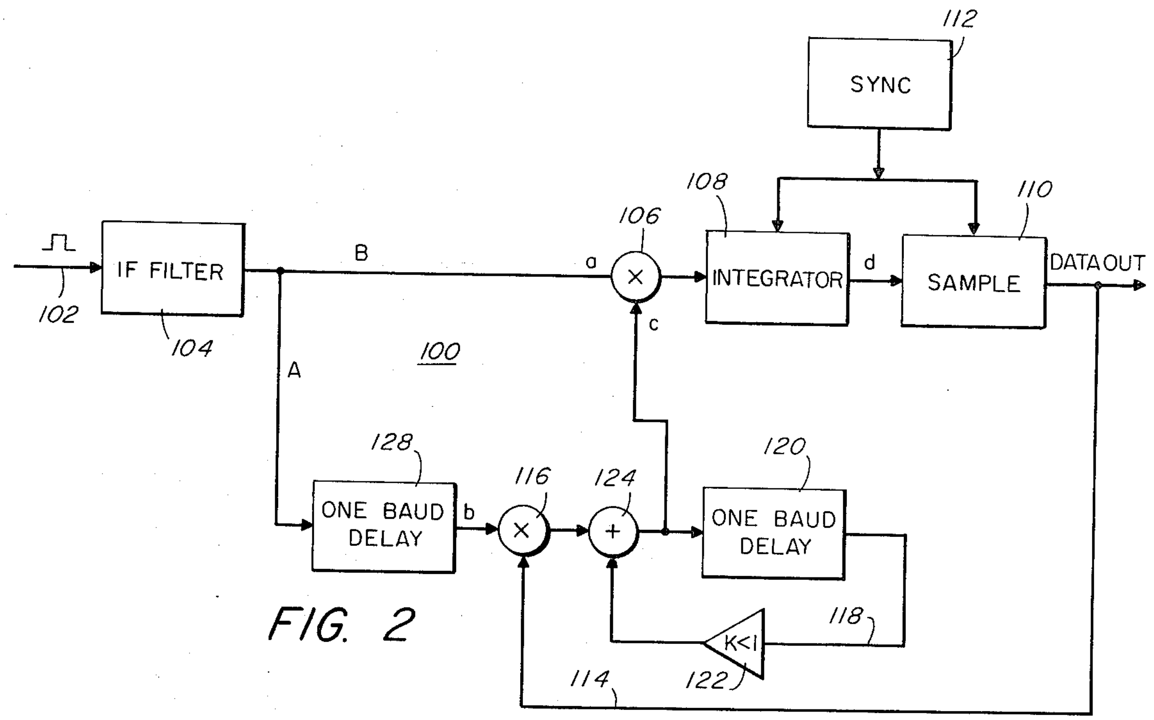
FIG. 2 is a block diagram of a differentially adaptive receiver in accordance with the present invention.

Referring now to FIG. 2, there is disclosed generally at 100 a differentially adaptive receiver in accordance with the present invention which may be used for receiving binary phase shift keyed transmission in a totally digital system. Phase coded pulses or phase shift modulation on a carrier is received from digital sources such as telephone data modems, microwave communications, radar, etc. over distorted, time variant or dispersive channels such as channel 102 which pulses are spread out in time due to multipath distortion with little resemblance to the pulse or waveform as originally transmitted. However, since such digital channels are linear or near linear, successive transmitted pulses will produce the same basic pulse response as long as the coherence time of the channel is much greater than the individual pulse durations. Thus the received pulses will bear a relative phase relationship to the transmitted pulses and the repetition period of pulses transmitted via channel 102 may be chosen such that the multipath contribution from one pulse will not overlap those of another pulse. While phase shift keyed pulses are described in the present embodiment, it is to be understood that other basic pulse types such as pulse compression, frequency shift keying and the like may be employed as the differentially adaptive receiver essentially provides the correct complex pulse envelope for whatever pulse is transmitted and received as will be described.

Figure 3A:
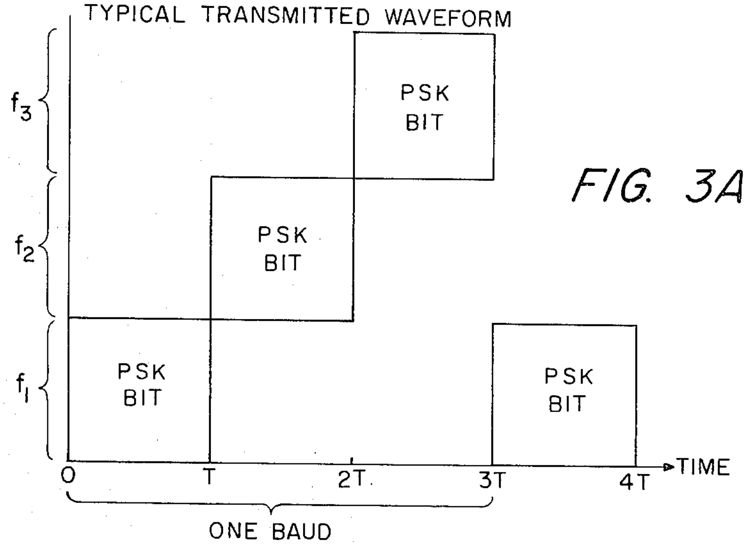
FIGS. 3A and 3B are representative waveforms of typical transmitted and received phase shift keyed pulses employed in conjunction with the present invention.
Figure 3B:
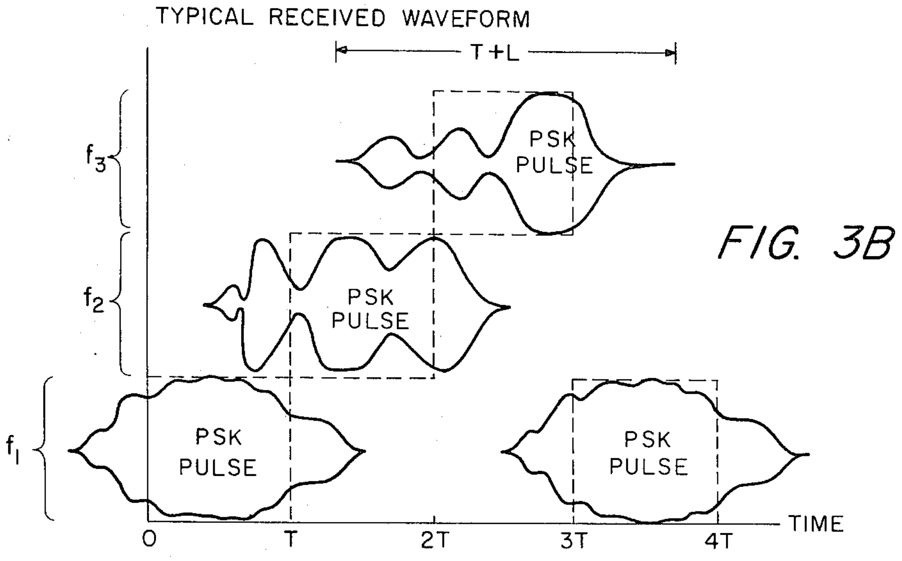

Referring now to FIGS. 3A and 3B, a typical phase shift keyed pulse is illustrated by FIG. 3A and the typical received waveform resulting from the transmitted pulse propagating over a distorted path is illustrated by FIG. 3B. The typical transmitted digitally phase modulated signal contains single pulses of a duration T with three successive pulses transmitted on three different frequencies $f_1$ through $f_3$ over a duration of 3T comprising one baud or one complete signal repetition. When the multipath pulse delay spread of the communication channel is L, then the received pulse will be stretched to a length of L + T. Where successive pulses are spaced by T seconds on the same frequency, intersymbol interference will result which can only be removed by adaptive equalization techniques. However, if as in the present system, alternate pulses are transmitted on adjacent frequencies such that the first frequency, $f_1$, is not employed again until after its multipath return has sufficiently decayed, the present differentially adaptive receiver can be utilized. It is apparent from FIG. 3B that extraneous multipath induced signal delay on the same frequency between successive pulses cannot overlap since the pulses on adjacent frequencies occur in the time spectrum where such overlap would ordinarily occur. The data pulse itself may be extracted by means of a band-pass filter at the receiver.

A received pulse is fed to a conventional intermediate frequency filter 104 as in any standard receiver. The output of the intermediate frequency filter 104 is coupled via path A to a delay of one baud for the generation of a reference pulse as will be explained and by path B to a mixer 106 where the generated reference pulse is compared with the received output from intermediate filter 104. The product of the received pulse and the generated reference pulse is integrated over a suitable period and by integrator 108 and a bit decision is made by sampler 110 as will be explained with synchronization being provided by a conventional sync circuit 112 to both the integrator 108 and to the sampling circuit 110. This operation is similar to that of a matched filter receiver provided that the reference pulse has the same phase and complex envelope as the received pulse. The output of sampler 110 is fed back via feedback loop 114 to an inverse modulator 116 wherein the digital phase modulation is removed from the distorted received pulse leaving only the pulse envelope. The decision feedback, which is determined by the actual data bits sampled by sampling circuit 110 is used as the reference. This reference has the same complex envelope as the incoming digits and provides a coherent reference which would be provided by the ideal matched filter if such were the case. In contradistinction, the standard phase shift keying receiver provides only a reference which does not change with changing channel conditions, whereas by providing the same complex envelope as the incoming signal, the provided reference follows the distortion of the incoming pulse, that is, it automatically adapts to channel induced distortion over a broad band. By delaying the incoming signal from the IF filter 104 by one baud in the delay 128 or the number of bits before pulse repetition occurs, suitable time is provided such that coincidence occurs between the signal upon which a bit decision must be made and the incoming signal since the integration and sampling operation also requires one baud for completion.

The reference signal is stabilized against occasional decision errors by a recirculation path 118 by which the inverse modulation output of modulator 116 is delayed by one baud in a conventional delay 120, is recirculated around the feedback path 118 through an operational amplifier 122 with a gain of less than 1 in accordance with well-known principles to a summer 124, the output of which in actuality is the stabilized reference. This positive feedback stabilization network additionally attenuates noise which may be present in the generated reference by recirculating the data bits such that they add in phase and thus provide an ideal coherent matched filter without the noise generally associated with either coherent matched filters or sampling circuits in general.

As previously described, the reference is obtained by storing previous pulses in a recirculating storage loop after their phase is corrected by decision feedback from sampler 110. If the decision feedback is essentially error free, as it would be for most error rates of interest, the signal amplitude of the feedback loop builds as the series $$1 + K + K^2 + \ldots = 1/(1-K)$$

while the noise power builds as $$1 + K^2 + K^4 + \ldots = 1/(1-K^2)$$

The resultant signal to noise ratio improvement in the reference loop is then $$(1+K)/(1-K)$$

greater than that of the received signal. A practical value of $K = 0.9$ yields a 13 db improvement in signal-to-noise ratio resulting in a nearly noiseless reference. This, of course, is ideal for use as a modem and the error performance of such a modem is $$P_e = Q \quad \sqrt{2\rho}$$

where $P_e$ is the bit error probability and $$\rho = \frac{\frac{E}{N_0}(1-K^2)}{\frac{T_0 N_0 W}{E}(1-K)^2 + 2(1-K)}$$

where $E$ is the energy per baud, $N_0$ is the input noise density, $W$ is the receiver rectangular noise bandwidth and $K$ is the gain of the recirculating storage loop. For values of $T_0\ W > 1$ and $K < 1$, error rate performance within a few tenths of a decibel of that of ideal coherent phase shift keying with matched filter detection may be easily obtained.

Figure 4:
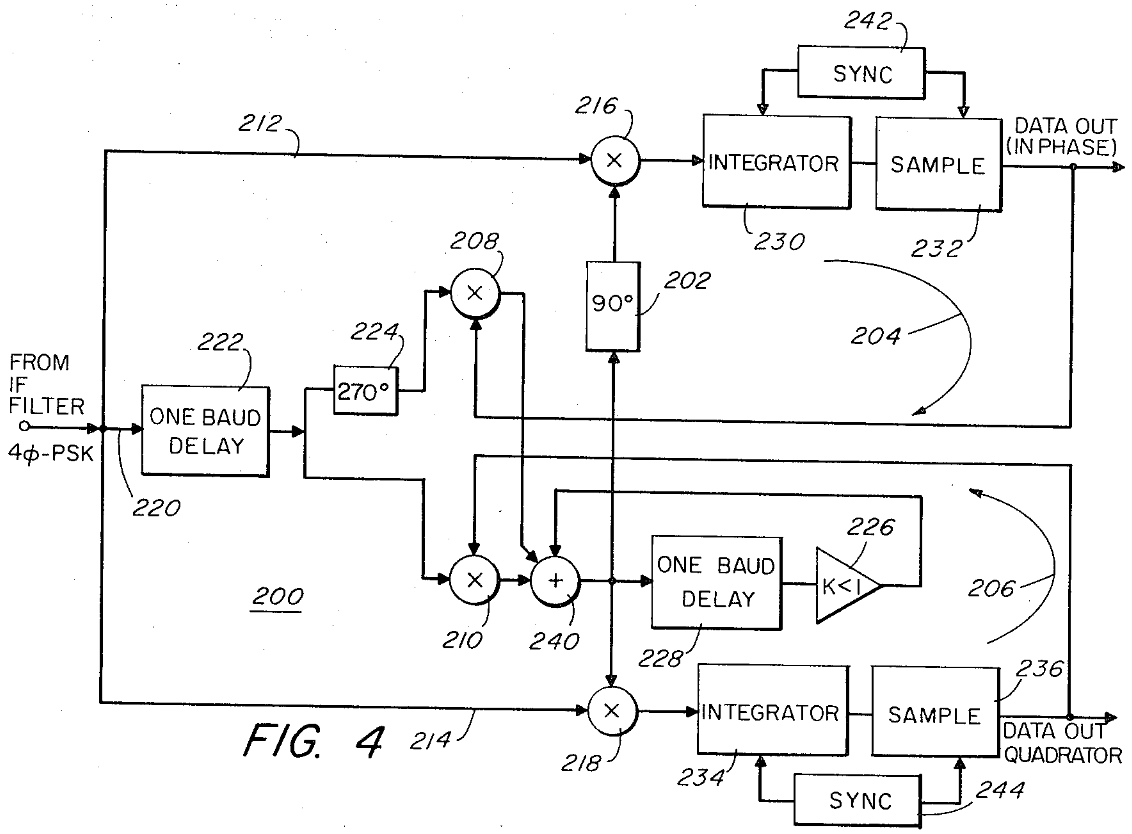
FIG. 4 is a block diagram of an alternative embodiment of the differentially adaptive receiver in which four phase modulation is employed.

Referring now to FIG. 4, a four phase differentially adaptive receiver for use in modulator-demodulator (modem) applications is illustrated generally at 200. The performance and operation of the four phase differentially adaptive receiver is similar to that of the two phase version illustrated by FIG. 2 except for the 90° phase shifter 202 which separates the signal received from the intermediate frequency filter of the receiver into in-phase and quadrature paths. Individual decision feedback and recirculating storage loops 204 and 206 provide the correct reference signals for the corresponding matched filter detectors 208 and 210.

This differentially adaptive receiver for modem applications is highly efficient and leads to an efficient modem design in which the differentially adaptive receiver can be used to recover energy in distorted received pulses whether the distortion is due to multipath propagation or filter distortion. An incoming distorted phase shift keyed signal is received at the intermediate frequency filter (not shown) of a differentially adaptive receiver and is coupled therefrom via paths 212 and 214 to multipliers 216 and 218 respectively. Simultaneously the output from the intermediate frequency filter is coupled via path 220 to a delay of one baud 222, the output of which is applied to two paths, one of which enters the decision feedback and recirculating storage loop of the in-phase signal 204 and the other of which enters the quadrature decision feedback and recirculating storage loop 206. The delayed output from the intermediate filter, which enters the in-phase loop 204, is phase shifted by 270° in phase shifter 224 and is then applied to the inverse modulator 208 of the in-phase loop while the unshifted delayed intermediate frequency filter distorted signal is applied directly to the quadrature inverse modulator 210 of the decision feedback and recirculating storage loop 206.

A recirculating loop consisting of an operational amplifier 226 and a one baud delay 228 operates to recirculate the delayed data such that they are added in phase to attenuate the noise and provide matched filtering without the noise inherent therein as previously described with respect to FIG. 2. This recirculation loop also stabilizes the reference against occasional decision errors in the integration and sampling circuits 230 and 232 respectively associated with loop 204 and integrator 234 and sampler 236 associated with the quadrature loop 206. The output of the recirculating stabilization loop is fed back to an adder 240 which also receives the inputs from inverse modulators 208 and 210 such that the output of adder 240 is the envelope of the incoming signal which envelope is applied as a reference through phase shifter 202 to multiplier 216 and directly to multiplier 218. This it may be seen that the recirculating loop recirculates the reference data which is applied both to the in-phase loop 204 and to the quadrature loop 206. Synchronization is provided to integrator 230 and sampler 232 by conventional synchronization means 242 and synchronization to integrator 234 and sampler 236 for the quadrature bit decision is provided by similar conventional synchronization means 244. The in-phase data output from sampler 232 and the quadrature data output from sampler 236 inverse modulates the incoming signals at modulators 208 and 210 and also is coupled out to data utilization means.

It is to be understood that for low data rate channels such as, for example, undersea acoustic channels complete digital circuitry may be realized in that the input signals may be converted to sample data format by an analog to digital converter and the samples suitably processed. The delay line, for example, 128 of FIG. 2 of the recirculating storage loops, are then reduced to either simple shift registers or other storage devices such as magnetic core, magnetic tape, etc., and the multiplication operation can be performed by central processor logic such as a small computer. The resultant device would be entirely digital and easily integrated with display performance similar to that of the previously described digital-to-analog systems.

The differentially adaptive receiver, when utilized in conjunction with predetection combination as a modification of the basic synthetic phase isolation predetection combination technique of the previously mentioned patent to W. J. Bickford for the reception of distorted digital signals, permits more efficient operation even when the propagation channel is highly frequency selective.

Figure 5:
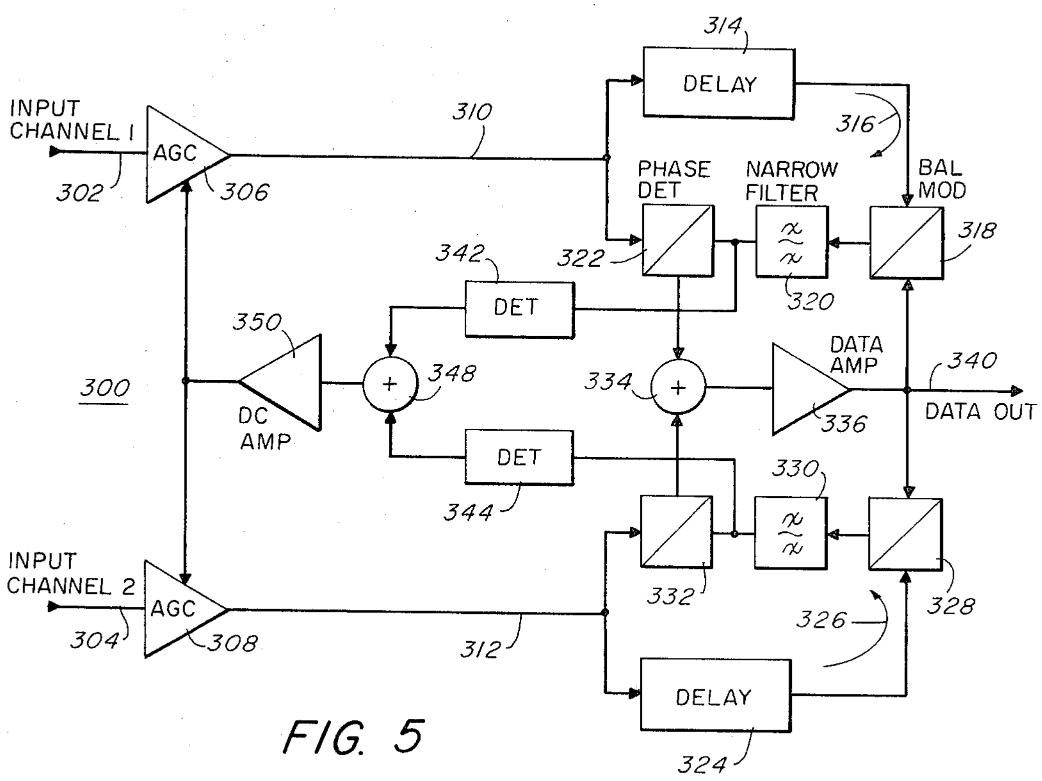
FIG. 5 is a block diagram of a two channel phase shift keyed combiner-demodulator system.

Referring to FIG. 5, the basic block diagram of a two channel phase shift keyed combiner-demodulator is illustrated generally at 300. This synthetic phase isolation predetection combiner operates by using decision feedback essentially to convert the received double sideband suppressed carrier modulated signal received at inputs 302 and 304 on input channels 1 and 2 respectively back into an unmodulated carrier. The resultant noisy carrier is filtered by the loop narrow band filters and a stable coherent carrier reference is obtained. The two channels are combined at baseband which improves the reliability of the final bit decision which then is used to restore the received signal to a reference carrier and the cycle is completed.

Automatic gain control amplifiers 306 and 308 associated with channels 1 and 2 respectively amplify the distorted signal input appearing on lines 310 and 312 respectively before delay and phase detection. For channel 1, the incoming distorted signal is delayed by delay 314 long enough so that a reference signal may be generated in loop 316 by modulation of the distorted signal with the output modulation in balanced modulator 318, the output of which balanced modulator is narrow band filtered in filter 320 and phase compared with the incoming undelayed signal by phase detector 322 to provide a reference; however, this is, of course, a phase reference only as the amplitude is undetected. Similarly delay 324 delays the input of channel 2 after automatic gain control by an amount sufficient to allow loop 326 to develop a phase reference signal in a similar manner as the phase reference signal in loop 316 is developed. Balanced modulator 328 modulates the received carrier with the amplified output of the loop phase detectors and the output of the balance modulator 328 is narrow band filtered by narrow band filter 330 prior to phase detection by phase detector 332 to develop the second reference signal, both of which references are added by adder 334, prior to amplification by operational amplifier 336 to develop an output signal which theoretically comprises only the data modulated on the carrier of channels 1 and 2. The output on line 340 may be coupled to any utilization device in which improved signal response is required.

Automatic gain control is necessary to maintain the signal level, and the signal amplitudes in channels 1 and 2 are detected by detectors 342 and 344 respectively after phase detection by phase detectors 322 and 332 respectively. The detected signal amplitudes are compared with each other in an adder 346 and after amplification by a dc amplifier 350 are supplied to AGC amplifiers 302 and 304 to maintain the signal amplitude in channels 1 and 2 respectively.

This dual channel phase shift keyed predetection combiner can be extended to any number of channels or to four phase modulation and has been experimentally observed to provide nearly ideal operation for rectangular pulses. However, such a system, as shown by FIG. 5, cannot efficiently combine pulses which have been distorted by either non-ideal filters or by propagation channel induced multipath. In all cases where a combiner is needed, at high data rates, the pulses received will become distorted due to multipath propagation. Thus the differentially adaptive receiver predetection combiner is a modification of the basic synthetic phase isolation combiner of FIG. 5 for digital signals which permits it to operate efficiently even when the propagation channel is highly frequency selective and at high data rates.

Figure 6:
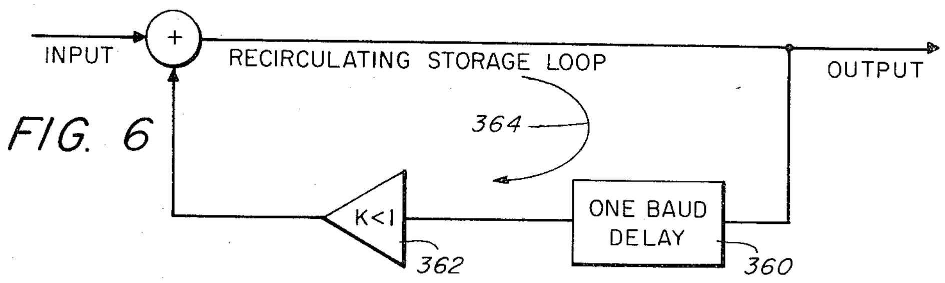
FIG. 6 is a block diagram of a recirculating storage loop in accordance with the present invention.

With reference to FIG. 6, the differentially adaptive receiver technique may be applied to the predetection combination phase shift keyed combiner-demodulator of FIG. 5 by replacing the narrow band filters 320 and 330 by the recirculating storage loop illustrated by FIG. 6. A signal format is employed such that recurrent pulses on the same frequency channel are separated by a time interval which is greater than the channel multipath induced or filter group induced delay spread. For purposes of explanation, the time between successive pulses on one frequency channel is one baud or the number of bits in one frequency pulse repetition.

It is sometimes desirable to maintain a constant envelope at the transmitter output. When this is the case, successive pulses can be transmitted on alternate frequencies until the first frequency is clear of multipath distortions. In this case, as before, balanced modulators 318 and 328 of the dual channel phase shift keyed combiner-demodulator will atttempt to impart to all received pulses the same information phase by the decision feedback on loops 316 and 326. These phase modified pulses are then passed through a one baud delay 360 and an operational amplifier 362 with a gain of less than one of the recirculating feedback loop 364 of FIG. 6 in place of narrow band filters 320 and 330. As described with reference to FIG. 1, the resultant signal to noise ratio improvement in the recirculation loop is $$(1+K)/(1-K)$$

which is large for practical values of $K$ and results in a practically noiseless reference.

Figure 7:
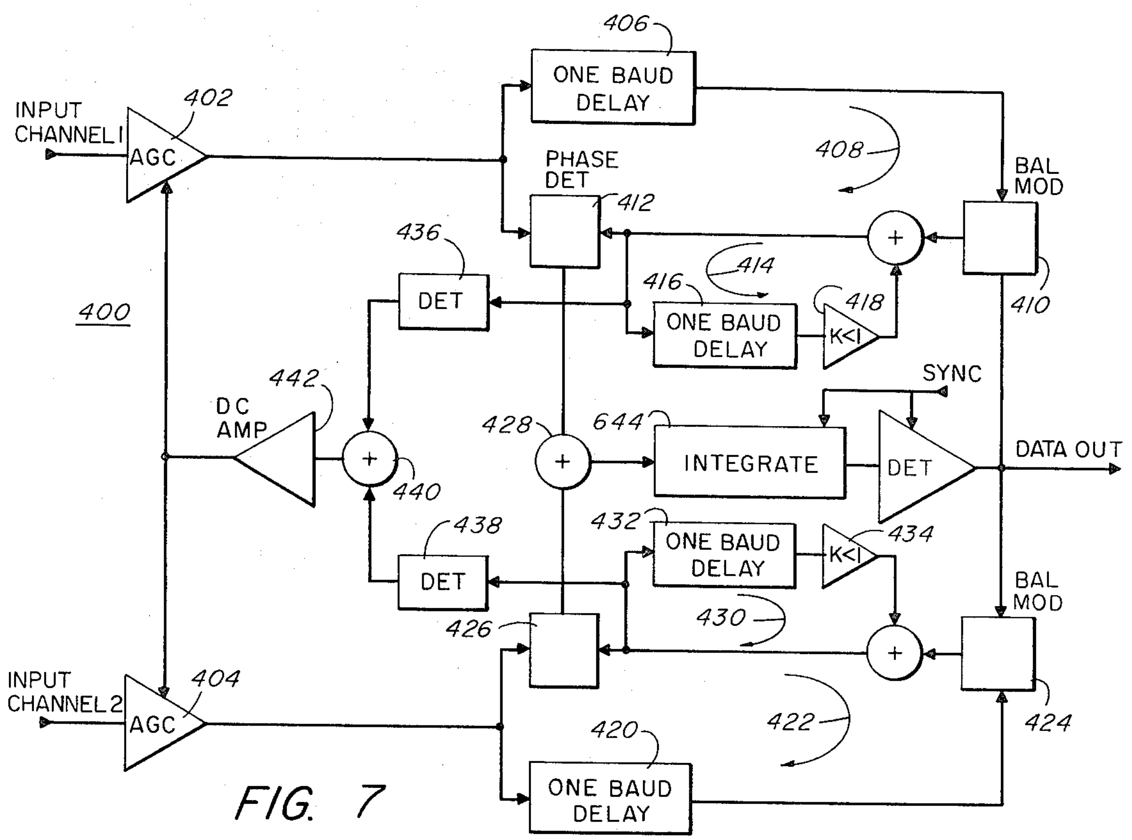
FIG. 7 is a block diagram of another embodiment of the present invention in which the recirculating storage loop of FIG. 6 is employed in a phase shift keyed combiner-demodulator for frequency selective channels.

Referring now to FIG. 7, an overall implementation of a two channel binary phase shift keyed combiner-demodulator for frequency selective channels is illustrated generally at 400. This implementation may be extended to any number of channels as in the system illustrated by FIG. 8 or to four phase shift keying modulation as in the four phase system illustrated by FIG. 4. As described with reference to FIG. 1, the error performance, or bit error probability per leg or channel is $$P_e = Q\ \sqrt{2\rho}$$

where $$P_e = \frac{\frac{E}{N_0}(1-K^2)}{\frac{T_0 N_0 W}{E}(1-K)^2 + 2(1-K)}$$

where $E/N_0$ is the energy per bit divided by the noise power density, $K < 1$ is the loop gain and $T_0$ is the receiver integration time. $T_0$ is made larger than the sum of the pulse duration plus multipath spread but smaller than the band duration. Within these limits, the system synchronization requirements are considerably less than alternate systems which attempt to gate out multipath errors.

The effective signal-to-noise ratio at the decision instant, $\rho$, and the corresponding error rate $P_e$ are derived as follows:

The efficiency with which received signal energy is utilized is determined assuming that the receiver has a rectangular noise bandwidth of zero to $W$ hertz. The normalized noise auto correlation function is then given by $$\Phi(\tau) = \sin(2\pi W\tau)/2\pi W\tau$$

Since the signal is also band limited, it may be represented by the sampling theorem $$S_a(t) = \sqrt{E}\sum_i a_i \frac{\sin(2\pi \mathrm{W}t - i\pi)}{2\pi \mathrm{W}t - i\pi}$$

where $E$ is the total energy of the signal per baud and the $\alpha_i$ are the Nyquist samples of the input waveform. An alternative representation for $S_a(t)$ is also possible when the transmitted signal duration is much smaller than the multipath spread or resolvable multipath which is $$S_a(t) = \sqrt{2EW}\,\Sigma\,\alpha_i\,\Phi(t - t_i)$$

where $\alpha_i$ is the amplitude of each multipath contribution and $t_i$ is the path delay. It is then assumed that $$\Phi(t_i - t_j) \cong 0.$$

In either case, the total energy of the signal is $$E = \int S_a^2(t)\,dt$$

from which it follows that $$\sum_i \alpha_i^2 = 1$$

due to the self regenerative and convolutional nature of the kernals, $$\Phi(t - i\pi).$$

The noise power at point $a$ of FIG. 2 is $$\overline{n_a^2} = N$$

and the correlation function is $$R_n(t) = N\,\Phi(\tau).$$

For fixed multipath conditions and errorless decision feedback the loop signal output is $$S_c(t) = \sqrt{E}\,\frac{1}{1-K}\sum_i a_i \frac{\sin(2\pi \mathrm{W}t - i\pi)}{2\pi \mathrm{W}t - i\pi}$$

The noise at $c$ is zero mean, Gaussian, with power $$\overline{n_c^2} = N/(1-K^2)$$

Multiplying and integrating gives the output at point $d$.

$$E_d = \int_{-T_0/2}^{T_0/2} [S_c(t) + N_c(t)][S_a(t) + N_a(t)]\,dt$$

Where $T_O$ is the total integration period per baud. The expected value of $E_d$ given a mark is $$\overline{E_d} = \int_{-T_0/2}^{T_0/2} S_c(t) S_a(t)\,dt$$

$$\overline{E_d} = \frac{E}{1-K}\int_{-T_0/2}^{T_0/2} \sum_i\sum_j a_i a_j \frac{\sin(2\pi \mathrm{W}t - i\pi)}{2\pi \mathrm{W}t - i\pi}\,\frac{\sin(2\pi \mathrm{W}t - j\pi)}{2\pi \mathrm{W}t - j\pi}$$

It is required that $$T_O \geq T + L$$

to encompass all of the received pulse. An approximation was made that the received signal is band limited and now it is assumed that it is also time limited. This approximation is valid for $$T_O W >> 1;$$

however, it will also be reasonably accurate for $T_O W$ near one. Hence, as far as the signal contribution is concerned, the limits of integration may be extended to infinity which yields $$\overline{E_d} = E/(1-K)$$

Likewise, the variance $\overline{E_d}$ can be computed $$\overline{E_d^2} - \overline{E_d}^2 = \int_{-T_0/2}^{T_0/2}\int_{-T_0/2}^{T_0/2} \{\overline{\eta_c(t_1)\eta_c(t_2)\,\eta_a(t_1)\eta_a(t_2)} + S_c(t_1)S_c(t_2)\,\overline{\eta_a(t_1)\eta_a(t_2)} + S_a(t_1)S_a(t_2)\,\overline{\eta_c(t_1)\eta_c(t_2)}$$

$$+ \text{cross term which average to zero}\}\,dt_1 dt_2$$

The first term is evaluated by simple change of variables to yield $$\frac{N^2}{1-K^2}\int_{-T_0}^{T_0}(T_0-|\tau|)\Phi^2(\tau)d\tau$$

which, for $$T_0W >> l$$

approaches $$[N^2/2\ (l-K^2)](T_0/w)$$

The last two terms are $$\left[\frac{EN}{(1-K)^2}+\frac{EN}{1-K^2}\right]\int_{-T_0/2}^{T_0/2}\int_{-T_0/2}^{T_0/2}\left\{\Phi(t_1-t_2)\cdot\right.$$

$$\left.\sum_i\sum_j a_ia_j\frac{\sin(2\pi Wt_1-i\pi)}{2\pi Wt_1-i\pi}\frac{\sin(2\pi Wt_2-j\pi)}{2\pi Wt_2-j\pi}\right\}dt_1dt_2$$

Again, under the assumption that $$T_0W >> 1$$

and letting the limits of integration approach infinity, one obtains for the variance $$\overline{E_d^2}-\overline{E_d}^2=[N^2/2\ (1-K^2)]\quad (T_0/W)+[EN/(1-K)^2]+[EN/(1-K^2)]$$

The effective signal-to-noise ratio at the decision instant is then $$\rho=\frac{\frac{E}{N_0}(1-K^2)}{\frac{T_0N_0W}{E}\cdot(1-K)^2+2(1-K)}$$

where $N_0 = N/W$ is the noise density. The corresponding error rate is then $$P_e = Q\quad \sqrt{2\rho}$$

A transmitted phase shift keyed multipath distorted pulse is received at input channels one and two of FIG. 7 for combination at baseband to improve the reliability of the final bit decision as previously described with regard to FIG. 5. Automatic gain control amplifiers 402 and 404 associated with channels one and two respectively amplify the distorted input signals before delay and phase detection. For channel one, the incoming signal is delayed by delay 406 for one signal repetition (1 baud) so that a reference signal may be generated around loop 408 by the modulated output of balanced modulator 410, the output of which modulator is phase detected and compared with the phase of the incoming undelayed channel one signal in phase detector 412 to provide a coherent reference. However, a secondary loop 414 is established as described in FIG. 6 in which the signal modulation is delayed an additional one baud by delay 416 in the recirculating positive feedback loop 416 comprising delay 416 and operational amplifier 418. This separates recurrent pulses on the same frequency channel by a time interval greater than the multipath delay and results in greatly improved noise reduction and stabilization in the generator reference signal.

Similarly, delay 420 delays the signal input of channel two after automatic gain control in AGC amplifier 404 sufficient to allow 422 to develop a phase reference signal in a similar manner as the phase reference signal is developed in loop 408. Balanced modulator 424 modulates the received carrier with the amplified output of the loop bit decision, and the modulator output is then coupled to phase detector 426 to develop a second reference signal, both of which references are added in adder 428. With the digital phase modulation removed from the distorted signal pulse, the resultant reference is stabilized further in a secondary positive feedback loop 430 similar to the stabilization of the channel one reference in secondary positive feedback loop 414. Loop 430 comprises a one baud delay 432 and an operational amplifier 434 with a gain of less than one. The signal with which the output of balanced modulator 424 is phase compared in phase detector 426 is the distorted undelayed channel two input signal, and the output reference is both amplitude and phase compared since the recirculated outputs of modulators 410 and 424 are detected by amplitude detectors 436 and 438 respectively and are compared one with the other at adder 440 prior to amplification by dc amplifier 442, the output of which amplifier is supplied as the gain control signal to AGC amplifiers 402 and 404 respectively to maintain the input signal amplitude.

The output of adder 428 comprises only the data modulated on the carrier of channels 1 and 2 if a carrier is employed. This output is integrated by integrator 644 over a period at least equal to the repetition rate. After each integration, which develops a bit decision, or data level of one or zero, the integrator is dumped back to its zero position for the next integration by a synchronization signal provided by either external or internal clocking. After detection by detector 646, the data output is coupled to any improved response signal utilization means.

Figure 8:
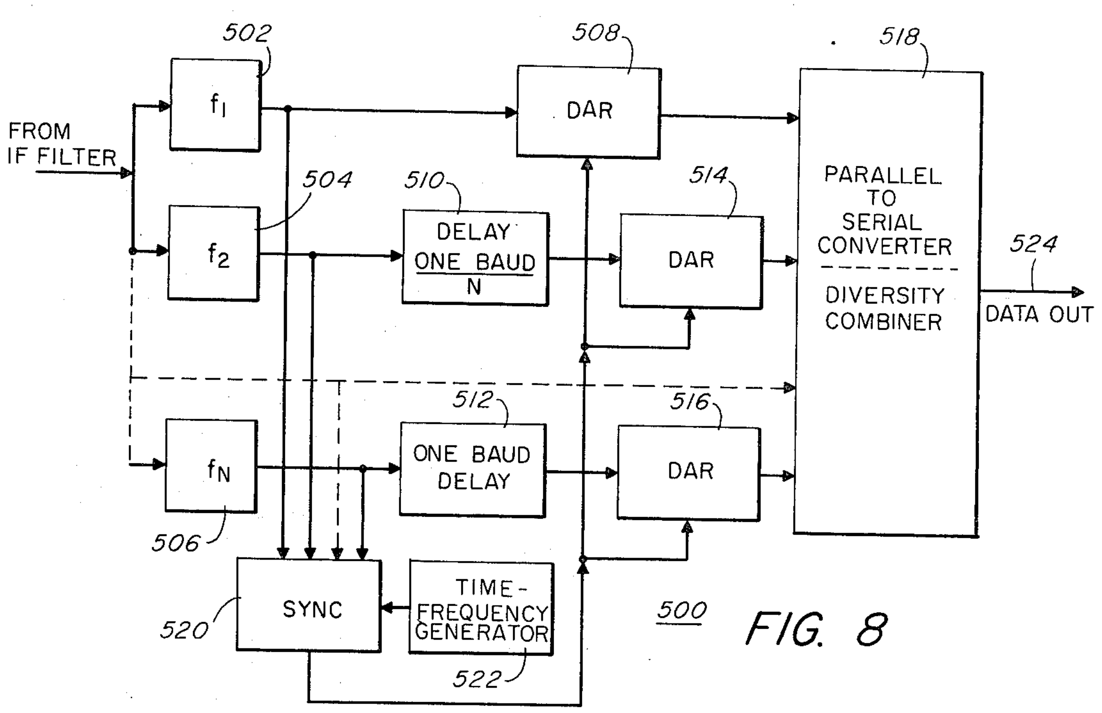
FIG. 8 is a block diagram of a differentially adaptive receiver system for time frequency waveforms.

Referring now to FIG. 8, a differentially adaptive receiver system for use with time frequency waveforms of the type used in digital troposcatter modem systems is disclosed generally at 500.

In this system, narrow pulses are generated on different frequencies and such that a constant transmission envelope is maintained. For N frequency operation the number of frequencies which must be used depends upon the delay spread, and $$N \geqslant 1 + (L/T)$$

where $T$ is the pulse duration which is the reciprocal of the bandwidth and $L$ is the channel multipath delay spread. The frequency spacing between channels must be greater than $1/T$.

A constant pulse envelope for the time frequency waveforms occurs when transmissions overlap due to multipath contribution. When successive pulses are transmitted on alternate carrier frequencies, the same carrier frequency is not used again until all multipath contributions have died out on that frequency. While any number of frequencies may be employed such as $f_1$, $f_2 \ldots f_N$, FIG. 8 discloses a three frequency system in which the output from the intermediate frequency filter of the receiver is separated into pulses at different frequencies by channelizing the filters 502, 504 and 506 for $f_1$, $f_2$ and $f_N$ respectively; thus each leg of the receiver system sees individual pulses separated by a time interval, which is longer than the multipath spread of the channel. The output from channelizing filter 502 is coupled to a differentially adaptive receiver 508 which is identical to that disclosed by FIG. 2 for processing to obtain an output signal which is substantially distortionless. Similarly the outputs of isolation channelizing filters 504 and 506 are coupled to delays 510 and 512 respectively with delay 510 being a delay of 1 baud/$N$ and delay 512 being a delay of one baud; thus the delays for successive frequencies are proportionate to the frequency received by their respective channelizing filter, the output of which filters is inputted to other differentially adaptive receivers shown as 514 and 516, the operation of which is described with reference to FIG. 1.

The outputs of all of the differentially adaptive receivers are coupled to a combiner 518 where either parallel to serial conversion or diversity combination can occur for the final serial data output. Synchronization for the differentially adaptive receivers is provided by a conventional synchronization generator 520 which is itself triggered by a local time frequency pattern generator 522. The serial output 524 is a demodulated digital signal in which the distortion due to multipath propagation is removed.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the appended claims.

What is claimed is:

1. A digital communication system comprising:

means for transmitting phase shift keyed signals over a multipath distorted channel;

means for receiving said transmitted multipath distorted phase shift keyed signals;

said receiving means being self-adaptive to said multipath distortion over a range of multipath spread; and said receiving means comprising a plurality of channels with feedback means in each of said plurality of channels for attenuating noise present in said channels.

2. A differentially adaptive receiver comprising:

means for receiving multipath distorted phase shift keyed signals comprising a plurality of channels;

means for deriving reference signal having substantially the same complex envelope as said received signals; and means for comparing received signals with said reference signal such that an output is generated which is adaptive to channel induced distortion over a range corresponding to the channel multipath spread and for providing recirculating feedback in each of said plurality of channels for attenuating noise present in said channels.

3. A predetection combination synthetic phase isolation system comprising:

means for receiving digital phase shift keyed signals on a plurality of frequency selective input channels;

balanced modulator means in each of said plurality of channels for imparting the same information phase by decision feedback to all of said received pulses;

recirculating feedback means in each of said plurality of channels for attenuating noise present in said channels;

means for phase comparing said information phase to said incoming signal in each of said channels; and means for combining the outputs of said phase comparing means to extract said digital phase shift keyed data for deriving a data output.

4. A predetection combination synthetic phase isolation system in accordance with claim 3 wherein said plurality of channels comprises two channels.

5. A receiver for receiving multipath corrupted phase shift keyed signals comprising:

means for integrating the undelayed received signal to obtain a decision feedback signal;

means for delaying the input signal for a period of time greater than the multipath signal delay spread to obtain a reference signal; and means for combining the undelayed signals and the reference signal to recirculate the phase shift keyed data such that multipath distortion is isolated.

6. A receiver in accordance with claim 5 further comprising means for inverse modulating the decision feedback signal with said delayed input signal such that a coherent reference is obtained.

7. A synthetic matched filter comprising:

means for receiving a phase shift keyed input signal;

means for deriving a digital state decision from said phase shift keyed input signal;

means for deriving a coherent reference including said digital state decision; and means for multiplying said phase shift keyed input signal with said coherent reference.

8. A synthetic matched filter in accordance with claim 7 wherein said means for deriving a coherent reference includes:

means for delaying the input phase shift keyed signal a predetermined time; and means for modulating sad input phase shift keyed signal with the digital state decision such that the digital phase modulation is removed from said input signal.

9. A synthetic matched filter in accordance with claim 8 wherein said modulating means is an inverse modulator and wherein the output of said inverse modulator is a reference signal having the same complex envelope as the incoming signal.

10. A synthetic matched filter in accordance with claim 9 wherein the digital state decision is decision feedback which is coupled on a feedback loop to said inverse modulator.

11. A synthetic matched filter in accordance with claim 8 wherein said predetermined time is the repetition interval of the input signal.

12. A synthetic matched filter in accordance with claim 11 wherein said input signals are phase shift keyed pulses.

13. A synthetic matched filter in accordance with claim 11 wherein said input signals are phase shift keyed modulation on a carrier.

14. A synthetic matched filter in accordance with claim 11 further comprising:

a positive feedback loop for recirculating said generated reference signal through an additional delay such that said reference signal is stabilized against occasional digital state decision errors and such that noise is substantially attenuated.

15. A synthetic matched filter in accordance with claim 14 wherein said additional delay corresponds to the repetition interval of the input signal.

16. A synthetic matched filter in accordance with claim 8 wherein said means for deriving a digital state decision includes:

means for integrating said incoming phase shift keyed signal over a predetermined period; and means for sampling the output of said integrating means to derive output data.

17. A digital communications system comprising:

means for transmitting a plurality of narrow pulses on different frequencies such that a constant transmission envelope is maintained;

means for receiving said transmitted pulses comprising a plurality of channelizing filters corresponding to said received frequencies for establishing a plurality of input channels, each of said channels including;

a delay proportionate to the signal repetition rate;

a synthetic matched filter having a decision feedback derived coherent reference; and means for combining the outputs of said channels to derive a signal substantially independent of multipath effects.

18. A digital communication system in accordance with claim 17 wherein said combining means is a parallel to series converter.

19. A digital communication system in accordance with claim 17 wherein said combining means is a diversity combiner.

20. In combination:

means for receiving signals over a frequency selective propagation channel comprising a plurality of channels;

means in each of said channels for separating recurrent pulses on the same frequency channel by a time interval greater than the channel delay spread;

means in each of said channels for imparting substantially the same information phase to all of the received signals; and means in each of said channels for recirculating said same information phase pulses for attenuating the noise present in said channels thereby providing a signal-to-noise ratio improvement in the recirculation loop which is $$(1+K)/(1-K)$$

where $K < 1$.

21. A communication system for multipath corrupted phase shift keyed signals comprising:

means for transmitting phase shift keyed signals over one or more multipath distorted channels;

means for integrating undelayed received signals to obtain a decision feedback signal;

means for delaying the input signals for a period of time greater than the multipath signal delay spread to obtain a reference signal; and means for combining the undelayed signals and the reference signal to recirculate the phase shift keyed data such that multipath distortion is isolated.

22. A system in accordance with Claim 22 further comprising means for inverse modulating the decision feedback signal with said delayed input signal such that a coherent reference is obtained.

23. A communication system comprising:

means for transmitting phase shift keyed signals over one or more multipath distorted channels;

means for receiving phase shift keyed input signals;

means for deriving a digital state decision from said phase shift keyed input signals;

means for deriving a coherent reference including said digital state decision; and means for multiplying said phase shift keyed input signals with said coherent reference.

24. A communication system in accordance with Claim 23 wherein said means for deriving a coherent reference includes;

means for delaying the input phase shift keyed signals a predetermined time; and means for modulating said input phase shift keyed signals with the digital state decision such that the digital phase modulation is removed from said input signal.

25. A communication system in accordance with Claim 24 wherein said modulating means is an inverse modulator and wherein the output of said inverse modulator is a reference signal having the same complex envelope as the incoming signal.

26. A communication system in accordance with Claim 25 wherein the digital state decision is decision feedback which is coupled on a feedback loop to said inverse modulator.

27. A communication system in accordance with Claim 24 wherein said predetermined time is the repetition interval of the input signals.

28. A communication system in accordance with Claim 27 wherein said input signals are phase shift keyed pulses.

29. A communication system in accordance with Claim 27 wherein said input signals are phase shift keyed modulation on a carrier.

30. A communication system in accordance with Claim 27 further comprising:

a positive feedback loop for recirculating said generated reference signal through an additional delay such that said reference signal is stabilized against occasional digital state decision errors and such that noise is substantially attenuated.

31. A communication system in accordance with Claim 30 wherein said additional delay corresponds to the repetition interval of the input signals.

32. A communication system in accordance with Calim 24 wherein said means for deriving a digital state decision includes:

means for integrating said incoming phase shift keyed signals over a predetermined period; and means for sampling the output of said integrating means to derive output data.

* * * * *